(12) United States Patent
Sasada et al.

(10) Patent No.: US 8,997,595 B2
(45) Date of Patent: Apr. 7, 2015

(54) TRANSMISSION FOR WORK VEHICLE

(75) Inventors: Atsushi Sasada, Komatsu (JP); Hiroaki Takeshima, Komatsu (JP); Yoshito Komatsu, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/817,608

(22) PCT Filed: Apr. 24, 2012

(86) PCT No.: PCT/JP2012/060938
§ 371 (c)(1),
(2), (4) Date: Feb. 19, 2013

(87) PCT Pub. No.: WO2013/031289
PCT Pub. Date: Mar. 7, 2013

(65) Prior Publication Data
US 2013/0239719 A1    Sep. 19, 2013

(30) Foreign Application Priority Data

Aug. 30, 2011  (JP) ................................. 2011-187416

(51) Int. Cl.
*F16H 3/08* (2006.01)
*F16H 3/083* (2006.01)
*F16H 3/093* (2006.01)

(52) U.S. Cl.
CPC ................ *F16H 3/083* (2013.01); *F16H 3/093* (2013.01); *F16H 2003/0936* (2013.01); *F16H 2200/0047* (2013.01); *F16H 2200/0091* (2013.01)

(58) Field of Classification Search
USPC .............. 74/331, 665 F, 665 G, 665 GA, 335
See application file for complete search history.

(56) References Cited

U.S. PATENT DOCUMENTS 5,787,756 A * 8/1998 Leber et al. ..................... 74/331
7,377,191 B2 * 5/2008 Gitt ................................ 74/330

(Continued)

FOREIGN PATENT DOCUMENTS

JP    62-118142 A    5/1987
JP    11-230278 A    8/1999

(Continued)

OTHER PUBLICATIONS

International Search Report for PCT/JP2012/060938.

*Primary Examiner* — Ha D Ho
*Assistant Examiner* — Emily Cheng
(74) *Attorney, Agent, or Firm* — Global IP Counselors, LLP

(57) ABSTRACT

A transmission includes an input shaft, an output shaft and an intermediate shaft, a power transmission mechanism and a control unit. The power transmission mechanism includes a forward travelling lower speed clutch, a forward travelling higher speed clutch, a rearward travelling clutch and a plurality of speed stage switching clutches. The control unit is configured to switch a gear state into a shiftable rearward travelling gear stage by turning off either the forward travelling lower speed clutch or the forward travelling higher speed clutch and by turning on the rearward travelling clutch in executing an operation of switching from forward travelling to rearward travelling, and to switch a gear stage into a shiftable forward travelling gear stage by turning off the rearward travelling clutch and turning on the forward travelling lower speed clutch in executing an operation of switching from rearward travelling to forward travelling.

12 Claims, 13 Drawing Sheets

(56) References Cited

U.S. PATENT DOCUMENTS

| | | | |
|---|---|---|---|
| 7,409,886 B2 * | 8/2008 | Gitt | 74/342 |
| 7,470,206 B2 * | 12/2008 | Rodgers, II | 475/218 |
| 8,499,657 B2 * | 8/2013 | Sasada et al. | 74/331 |
| 2002/0046617 A1 * | 4/2002 | Inagawa et al. | 74/335 |
| 2008/0190228 A1 * | 8/2008 | Long et al. | 74/331 |
| 2010/0257966 A1 * | 10/2010 | Rieger et al. | 74/331 |
| 2012/0048043 A1 * | 3/2012 | Vu | 74/331 |

FOREIGN PATENT DOCUMENTS

| | | |
|---|---|---|
| JP | 2007-506919 A | 3/2007 |
| JP | 2009-281512 A | 12/2009 |

* cited by examiner

| SPEED STAGE | FORWAD/REARWARD TRAVELLING SWITCHING (SPEED SWITCHING) CLUTCH | | | SPEED STAGE SWITCHING CLUTCH | | |
|---|---|---|---|---|---|---|
| | F L | F H | R | C 1 | C 2 | C 3 |
| F 1 | O | | | O | | |
| F 2 | O | | | | O | |
| F 3 | | O | | | O | |
| F 4 | O | | | | | O |
| F 5 | | O | | | | O |
| R 1 | | | O | O | | |
| R 2 | | | O | | O | |
| R 3 | | | O | | | O |

| PRE-GEAR SHIFTING SPEED STAGE | → | POST-GEAR SHIFTING SPEED STAGE | CLUTCH SWITCHING NUMBER | VEHICLE SPEED [ km/h ] | GEAR SHIFTING LEVER POSITION [ - ] |
|---|---|---|---|---|---|
| R1 (R, C1) | → | F1 ($\begin{smallmatrix}FL\\C1\end{smallmatrix}$) | 1 | 0 OR GREATER | "1" |
| | | F2 ($\begin{smallmatrix}FL\\C2\end{smallmatrix}$) | 2 | 0 ~ $V_{R12}$ | "2", "3", "A" |
| | | F4 ($\begin{smallmatrix}FL\\C3\end{smallmatrix}$) | 2 | $V_{R12}$ OR GREATER | |
| R2 (R, C2) | → | F1 ($\begin{smallmatrix}FL\\C1\end{smallmatrix}$) | - | - ~ - | - |
| | | F2 ($\begin{smallmatrix}FL\\C2\end{smallmatrix}$) | 1 | 0 ~ $V_{R22}$ | "1", "2", "3", "A" |
| | | F4 ($\begin{smallmatrix}FL\\C3\end{smallmatrix}$) | 2 | $V_{R22}$ OR GREATER | |
| R3 (R, C3) | → | F1 ($\begin{smallmatrix}FL\\C1\end{smallmatrix}$) | - | - ~ - | - |
| | | F2 ($\begin{smallmatrix}FL\\C2\end{smallmatrix}$) | 2 | 0 ~ $V_{R32}$ | "1", "2", "3", "A" |
| | | F4 ($\begin{smallmatrix}FL\\C3\end{smallmatrix}$) | 1 | $V_{R32}$ OR GREATER | |

FIG. 5

| PRE-GEAR SHIFTING SPEED STAGE | → | POST-GEAR SHIFTING SPEED STAGE | CLUTCH SWITCHING NUMBER | VEHICLE SPEED [ km/h ] | GEAR SHIFTING LEVER POSITION [ - ] |
|---|---|---|---|---|---|
| F1 (FL, C1) | → | R1 ($\begin{smallmatrix}R\\C1\end{smallmatrix}$) | 1 | 0   OR GREATER | "1" |
|  |  | R2 ($\begin{smallmatrix}R\\C2\end{smallmatrix}$) | 2 | 0   ~   $V_{F12}$ | "2", "3", "A" |
|  |  | R3 ($\begin{smallmatrix}R\\C3\end{smallmatrix}$) | 2 | $V_{F12}$   OR GREATER |  |
| F2 (FL, C2) | → | R1 | - | -   ~   - | - |
|  |  | R2 ($\begin{smallmatrix}R\\C2\end{smallmatrix}$) | 1 | 0   ~   $V_{F22}$ | "1", "2", "3", "A" |
|  |  | R3 ($\begin{smallmatrix}R\\C3\end{smallmatrix}$) | 2 | $V_{F22}$   OR GREATER |  |
| F3 (FH, C2) | → | R1 | - | -   ~   - | - |
|  |  | R2 ($\begin{smallmatrix}R\\C2\end{smallmatrix}$) | 1 | 0   ~   $V_{F32}$ | "1", "2", "3", "A" |
|  |  | R3 ($\begin{smallmatrix}R\\C3\end{smallmatrix}$) | 2 | $V_{F32}$   OR GREATER |  |
| F4 (FL, C3) | → | R1 | - | -   ~   - | - |
|  |  | R2 ($\begin{smallmatrix}R\\C2\end{smallmatrix}$) | 2 | 0   ~   $V_{F42}$ | "1", "2", "3", "A" |
|  |  | R3 ($\begin{smallmatrix}R\\C3\end{smallmatrix}$) | 1 | $V_{F42}$   OR GREATER |  |
| F5 (FH, C3) | → | R1 | - | -   ~   - | - |
|  |  | R2 ($\begin{smallmatrix}R\\C2\end{smallmatrix}$) | 2 | 0   ~   $V_{F52}$ | "1", "2", "3", "A" |
|  |  | R3 ($\begin{smallmatrix}R\\C3\end{smallmatrix}$) | 1 | $V_{F52}$   OR GREATER |  |

FIG. 6

TRANSMISSION FOR WORK VEHICLE

CROSS-REFERENCE TO RELAYED APPLICATIONS

This application claims priority to Japanese Patent Application No. 2011-187416 filed on Aug. 30, 2011, the disclosure of which is hereby incorporated herein by reference in its entirety.

TECHNICAL FIELD

The present invention relates to a transmission, and particularly to a multi-axis transmission to be installed in a work vehicle for executing a loader work.

BACKGROUND ART

A backhoe loader as a work vehicle includes a loader bucket disposed forwards of a vehicle body while including a backhoe disposed rearwards of the vehicle body. Further, an operator's seat disposed in a cab is rotatable while being configured to be oriented forwards during travelling or execution of a work with the loader bucket and be oriented rearwards during execution of a work with the backhoe.

A multi-axis transmission is installed in the backhoe loader as described above. The transmission includes an input shaft to which power is inputted from an engine, an output shaft for outputting power to a wheel and at least an intermediate shaft disposed between the input shaft and the output shaft. Further, each shaft is provided with a hydraulic clutch for switching between forward travelling and rearward travelling and a plurality of hydraulic clutches for switching back and forth among speed stages. It should be noted that the hydraulic clutches are hereinafter simply referred to as "clutches".

In the conventional transmission, the forward/rearward travelling switching clutch includes a single forward travelling clutch and a single rearward travelling clutch. In such structure, however, the number of gear stages is limited in forward travelling and thus a multiple stage configuration is impossible. Therefore, acceleration performance is not good during travelling in a speed range from a middle speed to a high speed.

In view of the above, it can be considered to implement a multiple stage configuration by increasing the number of speed stage switching clutches. However, with increase in the number of the speed stage switching clutches, the number of components is increased and the transmission is entirely increased in its size. Further, with increase in the number of the speed stage switching clutches, the number of speed stages is increased not only for forward travelling but also for rearward travelling that a multiple stage configuration thereof is unnecessary.

To solve such drawback, a transmission as described in Japan Laid-open Patent Application Publication No. JP-A-H11-230278 has been produced. The transmission described in this publication includes an input shaft, two intermediate shafts and an output shaft. Further, the input shaft is provided with a rearward travelling clutch and a forward travelling lower speed clutch, while one of the intermediate shafts is provided with a forward travelling higher speed clutch. Yet further, three clutches are provided as speed stage switching clutches.

As described above, the transmission described in the above mentioned publication includes the forward travelling lower speed clutch and the forward travelling higher speed clutch as forward travelling lower/higher speed switching clutches, and includes first to third clutches as speed stage switching clutches. Therefore, six speed stages can be obtained in forward travelling and a multiple stage configuration is implemented with a small number of components.

SUMMARY

A V-shape work is known as a representative work to be executed by backhoe loaders and wheel loaders. The V-shape work is a type of work described as follows.

Specifically, an excavation work is executed in a given position, and subsequently, a load such as earth and sand, put in a bucket, is lifted up by elevating a boom while the vehicle is moved rearwards. Subsequently, the transmission is switched from rearward travelling to forward travelling, and the boom is further lifted up while the vehicle is moved forwards for approaching a dump truck. Then, the bucket is dumped for discharging the earth and sand onto the dump truck. Subsequently, the vehicle is moved back and forth without being loaded and is again returned to the excavation position.

During execution of the V-shape work, an operator simultaneously operates a work lever and a steering wheel, and generally, executes a forward/rearward travelling switching operation while keeping pressing down an accelerator pedal for increasing the elevation speed of the boom.

In the V-shape work as described above, the forward/rearward travelling switching operation is executed while the accelerator pedal is kept pressed down. A large load torque thereby acts on the forward/rearward travelling clutch. Therefore, increase in clutch capacity and enhancement of the clutch strength are required to endure a V-shape, for instance, by increasing the number of clutch plates to which friction members are attached with respect to the forward travelling lower speed clutch, the forward travelling higher speed clutch and the rearward travelling clutch. However, this obstructs reduction in size of the transmission.

It is an object of the present invention to minimize enhancement, including increase in clutch capacity and high strengthening, of a forward/rearward travelling switching clutch and to inhibit increase in size of a transmission especially in a work vehicle for executing a V-shape work.

A transmission for a work vehicle according to a first aspect of the present invention is of a multi-axis type to be installed in the work vehicle for executing a loader work, and includes: an input shaft to which power is inputted; an output shaft coupled to a wheel of the work vehicle; at least an intermediate shaft disposed between the input shaft and the output shaft; a power transmission mechanism configured to transmit power from the input shaft to the output shaft through the intermediate shaft; and a switching unit configured to switch a power transmission path from the input shaft to the output shaft. The power transmission mechanism includes: a forward travelling lower speed clutch configured to be set in a power transmitted state in a forward travelling lower speed range; a forward travelling higher speed clutch configured to be set in the power transmitted state in a forward travelling higher speed range; a rearward travelling clutch configured to be set in the power transmitted state in rearward travelling; and a plurality of speed stage switching clutches for switching back and forth among speed stages. The switching unit is configured to: switch a gear stage into a shiftable rearward travelling gear stage by setting either the forward travelling lower speed clutch or the forward travelling higher speed clutch in a power blocked state and by setting the rearward travelling clutch in the power transmitted state when an operation of switching into rearward travelling is executed during forward travelling; and switch a gear stage into a shiftable forward travelling gear stage by setting the rearward travelling clutch in the power blocked state and by setting the forward travelling lower speed clutch in the power transmitted state when an operation of switching into forward travelling is executed during rearward travelling.

In the transmission, a clutch switching control is executed in the following manner and a post-gear shifting gear stage is selected when a forward/rearward travelling switching operation is executed in a V-shape work or etc. Specifically, when a switching operation into rearward travelling is executed during forward travelling, a pre-gear shifting stage is switched into a shiftable rearward travelling gear stage by setting either the forward travelling lower speed clutch or the forward travelling higher speed clutch in the power blocked state and by setting the rearward travelling clutch in the power transmitted state. Further, when a switching operation into forward travelling stage is executed during rearward travelling, a pre-gear shifting stage is switched into a shiftable forward travelling gear stage by setting the rearward travelling clutch in the power blocked state and by setting the forward travelling lower speed clutch in the power transmitted state.

Here, in executing a forward/rearward travelling switching operation, only the forward travelling lower speed clutch and the rearward travelling clutch, amongst three forward/rearward travelling switching clutches, are set in the power transmitted state. Therefore, it is required to enhance only these clutches and the forward travelling higher speed clutch can be reduced in its size. In other words, it is possible to minimize the number of clutches that should be enhanced for enduring against a forward/rearward travelling switching operation in a V-shape work or etc.

A transmission for a work vehicle according to a second aspect of the present invention relates to the transmission of the first aspect, and wherein the switching unit is configured to maintain either the power transmitted state or the power blocked state of each of the plural speed stage switching clutches in executing a forward/rearward travelling switching operation.

In the transmission, limitation is imposed on gear stages selectable after gear shifting. However, gear shifting is enabled only by switching a single clutch in gear shifting. Therefore, time required for gear shifting is reduced and responsiveness is enhanced.

A transmission for a work vehicle according to a third aspect of the present invention relates to the transmission of the first aspect, and further includes a vehicle speed detecting unit detecting a vehicle speed. Further, the switching unit is configured to control the power transmitted state and the power blocked state of the plural speed stage switching clutches in accordance with a detection result of the vehicle speed detecting unit in executing the forward/rearward travelling switching operation.

In general, a forward/rearward travelling switching operation is executed during execution of a work at a lower vehicle speed. On the other hand, a forward/rearward travelling switching operation may be executed at a higher vehicle speed by an erroneous operation or etc. When such abnormal operation is executed, a bearing, a seal member and etc. in the transmission may be damaged by over rotation.

In view of the above, in the transmission of the third aspect, the vehicle speed is detected; a forward/rearward travelling switching operation is determined to be an abnormal operation, for instance, when being executed at a higher vehicle speed; and a pre-gear shifting stage is switched into, for instance, a higher gear stage by controlling the speed stage switching clutches as well as the forward/rearward travelling switching clutches. Accordingly, over rotation can be inhibited and damage of the bearing and the seal member in the transmission can be avoided.

A transmission for a work vehicle according to a fourth aspect of the present invention relates to the transmission of the first aspect or the third aspect, and further includes a gear shifting lever position detecting unit detecting a position of a gear shifting lever for determining a maximum speed stage. Further, the switching unit is configured to control the power transmitted state and the power blocked state of the plural speed stage switching clutches in accordance with a detection result of the gear shifting lever position detecting unit in executing the forward/rearward travelling switching operation.

The work vehicle in the fourth aspect of the present invention is provided with the gear shifting lever for determining a maximum speed stage. The maximum gear stage can be switched among, for instance, four levels by means of the gear shifting lever. When an operator sets the gear shifting lever to be in a position corresponding to the maximum speed stage of the lowest level, for instance, this indicates that the operator intends to execute a work at a lower speed. In such case, when a pre-gear shifting stage is switched into a higher speed stage by a forward/rearward travelling switching operation, this results in execution of gear shifting against operator's intension.

In view of the above, the transmission of the fourth aspect controls a post-gear shifting speed stage in accordance with the position of the gear shifting lever with a respect for operator's intension. Thus, gear shifting is executed in accordance with operator's intension in executing a forward/rearward travelling switching operation.

A transmission for a work vehicle according to a fifth aspect of the present invention relates to the transmission of the first aspect or the second aspect, and wherein the speed stage switching clutches include a first clutch, a second clutch and a third clutch. Further, the switching unit is configured to switch back and forth among five forward travelling speed stages from a forward travelling first speed stage to a forward travelling fifth speed stage and switch among speed stages from a rearward travelling first speed stage to a rearward travelling third speed stage. Yet further, the switching unit is configured to control the respective clutches at the respective speed stages as follows.

The switching unit sets the forward travelling lower speed clutch and the first clutch in the power transmitted stage and sets the other clutches in the power blocked state at the forward travelling first speed stage.

The switching unit sets the forward travelling lower speed clutch and the second clutch in the power transmitted state and sets the other clutches in the power blocked state at the forward travelling second speed stage.

The switching unit sets the forward travelling higher speed clutch and the second clutch in the power transmitted state and sets the other clutches in the power blocked state at the forward travelling third speed stage.

The switching unit sets the forward travelling lower speed clutch and the third clutch in the power transmitted state and sets the other clutches in the power blocked state at the forward travelling fourth speed stage.

The switching unit sets the forward travelling higher speed clutch and the third clutch in the power transmitted state and sets the other clutches in the power blocked state at the forward travelling fifth speed stage.

The switching unit sets the rearward travelling clutch and the first clutch in the power transmitted state and sets the other clutches in the power blocked state at the rearward travelling first speed stage.

The switching unit sets the rearward travelling clutch and the second clutch in the power transmitted state and sets the other clutches in the power blocked state at the rearward travelling second speed stage.

The switching unit sets the rearward travelling clutch and the third clutch in the power transmitted state and sets the other clutches in the power blocked state at the rearward travelling third speed stage.

Here, gear shifting is enabled only by switching a single type of clutch in gear shifting among the first to third speed stages of forward travelling for normally executing a loader work. Specifically, gear shifting is enabled between the forward travelling first speed stage and the forward travelling second speed stage only by switching between the first clutch and the second clutch. Gear shifting is enabled between the forward travelling second speed stage and the forward travelling third speed stage only by switching between the forward travelling lower speed clutch and the forward travelling higher speed clutch.

A transmission for a work vehicle according to a sixth aspect of the present invention relates to the transmission of the fifth aspect, and wherein the switching unit is configured to control the respective clutches as follows in executing a forward/rearward travelling switching operation.

The switching unit is configured to maintain the power transmitted state of the first clutch while being configured to activate/deactivate the power transmitted state of the rearward travelling clutch and deactivate/activate the power transmitted state of the forward travelling lower speed clutch when the forward/rearward travelling switching operation is executed at either the forward travelling first speed stage or the rearward travelling first speed stage.

The switching unit is configured to maintain the power transmitted state of the second clutch while being configured to activate/deactivate the power transmitted state of the rearward travelling clutch and deactivate/activate the power transmitted state of the forward travelling lower speed clutch when the forward/rearward travelling switching operation is executed at either the forward travelling second speed stage or the rearward travelling second speed stage.

The switching unit is configured to maintain the power transmitted state of the second clutch while being configured to activate the power transmitted state of the rearward travelling clutch and deactivate the power transmitted state of the forward travelling higher speed clutch when the rearward traveling switching operation is executed at the forward travelling third speed stage.

The switching unit is configured to maintain the power transmitted state of the third clutch while being configured to activate/deactivate the power transmitted state of the rearward travelling clutch and deactivate/activate the power transmitted state of the forward travelling lower speed clutch when the forward/rearward travelling switching operation is executed at either the forward travelling fourth speed stage or the rearward travelling third speed stage.

The switching unit is configured to maintain the power transmitted state of the third clutch while being configured to activate the power transmitted state of the rearward travelling clutch and deactivate the power transmitted state of the forward travelling higher speed clutch when the rearward travelling switching operation is executed at the forward travelling fifth speed stage.

In the present invention as described above, enhancement of a forward/rearward travelling switching clutch can be minimized and increase in size of a transmission can be inhibited especially in a work vehicle for executing a V-shape work.

BRIEF DESCRIPTION OF THE DRAWINGS

FIG. 5 is a table representing pre-gear shifting gear stages and post-gear shifting gear stages in switching rearward travelling into forward travelling.

FIG. 6 is a table representing pre-gear shifting gear stages and post-gear shifting gear stages in switching forward travelling into rearward travelling.

DESCRIPTION OF THE EMBODIMENTS

Overall Structure

Figure 1:
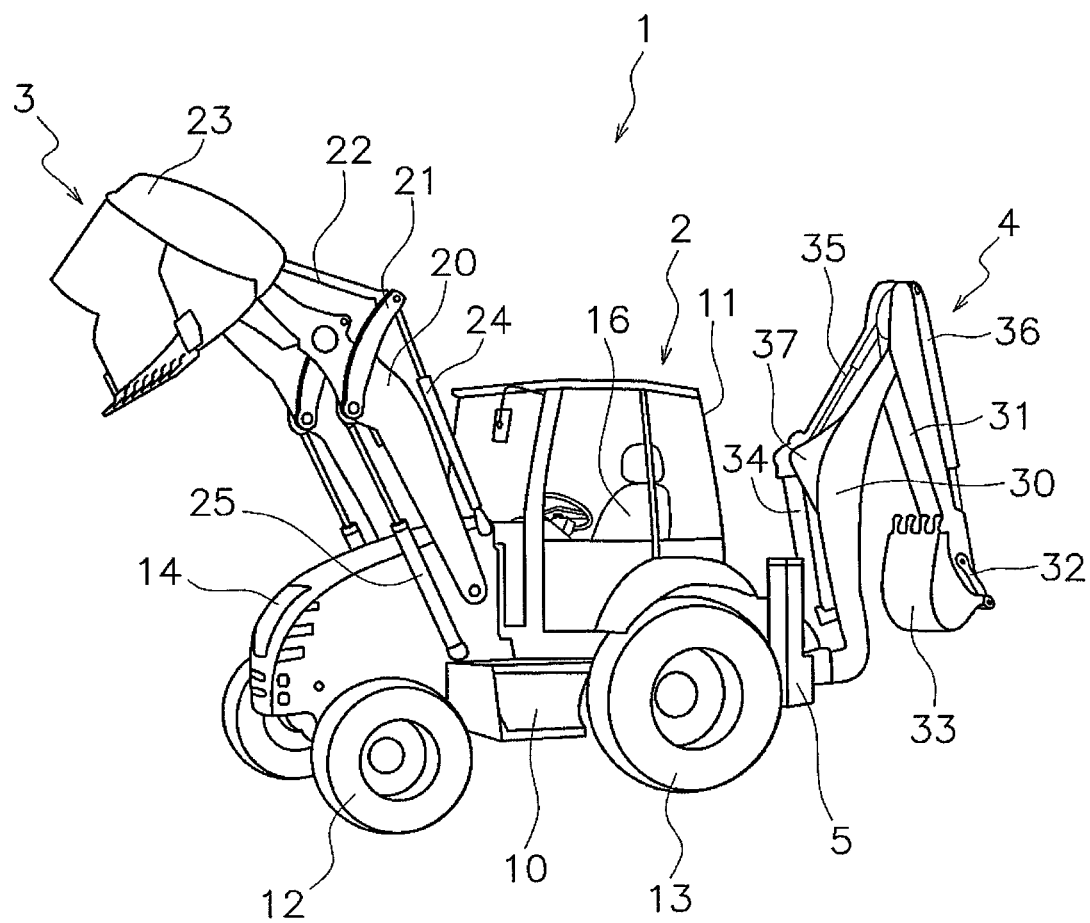
FIG. 1 is an external perspective view of a backhoe loader according to an exemplary embodiment of the present invention.

FIG. 1 illustrates an external view of a backhoe loader 1 as a work vehicle according to an exemplary embodiment of the present invention. The backhoe loader 1 is a stand-alone work vehicle that can execute an excavation work and a loading work. The backhoe loader 1 mainly includes a main body 2, a loader 3, a backhoe 4 and right and left stabilizers 5.

The main body 2 includes a frame 10 supporting machineries such as an engine and a transmission 6 (see FIG. 2), a cab 11 mounted on the frame 10, a pair of front wheels 12 and a pair of rear wheels 13. The backhoe loader 1 has a characteristic structure that the diameter of the rear wheel 13 is greater than that of the front wheel 12. Therefore, an axle coupled to the front wheels 12 is disposed in a position lower than that of an axle coupled to the rear wheels 13. The machineries such as the engine and the transmission are covered with an exterior cover 14. An operator's seat 16 on which an operator is seated is disposed inside the cab 11. The operator's seat 16 is rotatable between a forwardly oriented position and a backwardly oriented position. Further, a steering wheel, a variety of pedals, operating members for operating the loader 3 and the backhoe 4, a forward/rearward travelling switching lever for executing a forward/rearward travelling switching operation, a gear shifting lever for determining the maximum speed stage and etc. are disposed inside the cab 11.

The engine is installed in the front part of the frame 10. The engine drives the front wheels 12 and the rear wheels 13 through the transmission and the axles and drives hydraulic pumps for actuating a variety of hydraulic machines.

Figure 2:
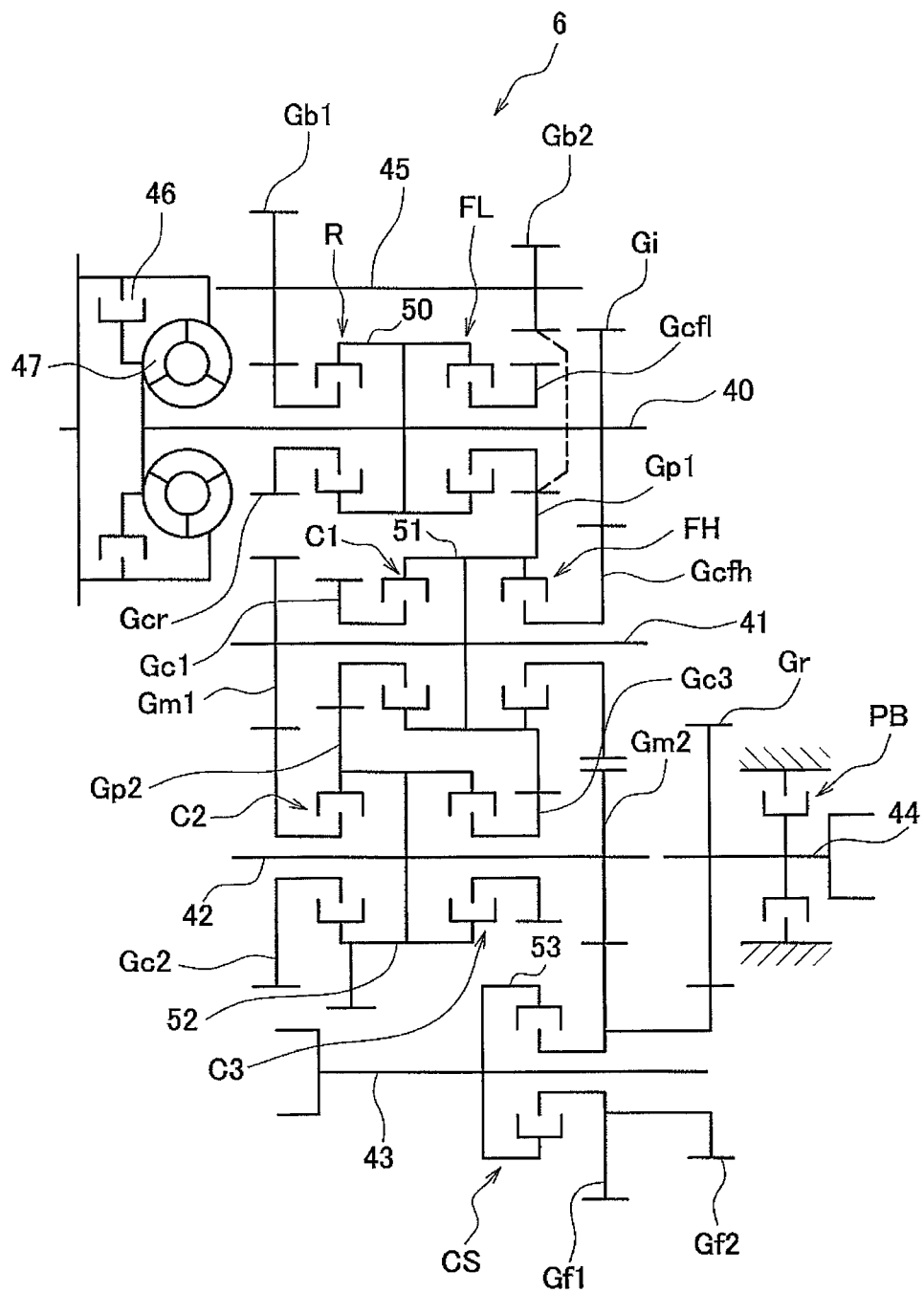
FIG. 2 is a schematic configuration diagram of a transmission of the backhoe loader.

Although explained below in detail, as illustrated in FIG. 2, the transmission 6 includes a plurality of shafts, and each of the shafts other than a reverse shaft is provided with either a hydraulic clutch or a hydraulic brake.

The loader 3 is a working unit disposed forwards of the cab 11 for executing a loading work. The loader 3 includes loader arms 20, brackets 21, links 22, a loader bucket 23, bucket cylinders 24 and arm cylinders 25.

The base ends of the loader arms 20 are rotatably supported by the frame 10, while the loader bucket 23 is rotatably attached to the tip ends of the loader arms 20. The base ends of the brackets 21 are rotatably supported by the loader arms 20, while the tip ends of rods of the bucket cylinders 24 and one ends of the links 22 are rotatably coupled to the tip ends of the brackets 21. The base ends of the bucket cylinders 24 are rotatably supported by the frame 10. Further, the tip ends of the links 22 are rotatably coupled to the bucket 23. The base ends of the arm cylinders 25 are rotatably supported by the frame 10, while the tip ends of rods of the arm cylinders 25 are rotatably coupled to longitudinally intermediate portions of the loader arms 20.

With the aforementioned structure, the loader arms 20 are upwardly rotated when the rods of the arm cylinders 25 are protruded, whereas the loader arms 20 are downwardly rotated when the rods of the arm cylinders 25 are retracted. Further, when the rods of the bucket cylinders 24 are protruded, the brackets 21 are forwardly rotated. Accordingly, the links 22 are forwardly moved and the loader bucket 23 is downwardly rotated. Contrarily, when the rods of the bucket cylinders 24 are retracted, the brackets 21 are backwardly rotated. Accordingly, the links 22 are backwardly moved and the loader bucket 23 is upwardly rotated.

The backhoe 4 is a working unit disposed rearwards of the cab 11 for executing an excavation work. The backhoe 4 includes a boom 30, an arm 31, a bucket link 32, a backhoe bucket 33, a boom cylinder 34, an arm cylinder 35 and a bucket cylinder 36. The base end of the boom 30 is supported by the frame 10 through a bracket (not illustrated in the figures) while being rotatable in the right-and-left direction. The base end of the arm 31 is rotatably coupled to the tip end of the boom 30, while the backhoe bucket 33 is rotatably coupled to the tip end of the arm 31. One end of the boom cylinder 34 is rotatably coupled to a bracket (not illustrated in the figures) attached to the frame 10, while the other end of the boom cylinder 34 is rotatably coupled to a boom bracket 37 fixed to the boom 30. One end of the arm cylinder 35 is rotatably coupled to the boom bracket 37, while the other end of the arm cylinder 35 is rotatably coupled to the base end of the arm 31. The base end of the bucket cylinder 36 is rotatably coupled to the arm 31, while the tip end of the bucket cylinder 36 is rotatably coupled to the bucket link 32.

With the structure as described above, the boom 30 is rotated downwards when a rod of the boom cylinder 34 is protruded, whereas the boom 30 is rotated upwards when the rod of the boom cylinder 34 is retracted. Further, the arm 31 is rotated downwards when a rod of the arm cylinder 35 is protruded, whereas the arm 31 is rotated upwards when the rod of the arm cylinder 35 is retracted. Moreover, when a rod of the bucket cylinder 36 is protruded, the backhoe bucket 33 is rotated through the bucket link 32 and an opening of the backhoe bucket 33 approaches the arm 31. On the other hand, when the rod of the bucket cylinder 36 is retracted, the backhoe bucket 33 is rotated through the bucket link 32 and the opening of the backhoe bucket 33 is separated away from the arm 31.

It should be noted that the backhoe 4 includes a bracket cylinder for rotating the boom bracket coupling the boom 30 to the frame 10 in the right-and-left direction although not illustrated in the figures. One end of the bracket cylinder is rotatably coupled to the frame 10, whereas the other end of the bracket cylinder is rotatably coupled to the boom bracket. The boom bracket is rotated to one side in the right-and-left direction when a rod of the bracket cylinder is protruded, whereas the boom bracket is rotated to the other side in the right- and left direction when the rod of the bracket cylinder is retracted.

The right and left stabilizers 5 serve to prevent the backhoe loader 1 from falling down by stabilizing the posture of the backhoe loader 1 during execution of a work with the backhoe 4. The right and left stabilizers 5 are respectively disposed on the rear right part and the rear left part of the frame 10. The posture of the backhoe loader 1 can be stabilized in executing an excavation work by causing the stabilizers 5 to make contact with the ground while the stabilizers 5 are laterally stretched on the right and left sides of the backhoe loader 1 and by lifting up the rear part of the main body of the backhoe loader 1 until the rear wheels 13 are separated away from the ground.

Transmission

FIG. 2 represents a schematic configuration of the transmission 6. The transmission 6 includes an input shaft 40 to which power is inputted, a first intermediate shaft 41, a second intermediate shaft 42, a front output shaft 43, a rear output shaft 44 and a reverse shaft 45. The respective shafts 40 to 45 are disposed in parallel to each other. Further, the transmission 6 includes a torque converter 47 having a lock-up clutch 46.

Input Shaft 40

Power is inputted into the input shaft 40 from the engine either through the torque converter 47 or through the lock-up clutch 46. The input shaft 40 is disposed in the highest position amongst the shafts 40 to 45. The input shaft 40 is provided with an input shaft gear Gi, a rear travelling clutch R and a forward travelling lower speed clutch FL. The input shaft gear Gi is fixed to the input shaft 40 while being non-rotatable relatively thereto. The input side of the rearward travelling clutch R and that of the forward travelling lower speed clutch FL commonly have an input shaft clutch pack 50. The input shaft clutch pack 50 is fixed to the input shaft 40 while being non-rotatable relatively thereto. A rearward travelling clutch gear Gcr is disposed on the output side of the rearward travelling clutch R, while a forward travelling lower speed clutch gear Gcfl is disposed on the output side of the forward travelling lower speed clutch FL. The rearward travelling clutch gear Gcr and the forward travelling lower speed clutch gear Gcfl are both supported while being rotatable relatively to the input shaft 40.

First Intermediate Shaft 41

The first intermediate shaft 41 is disposed between the input shaft 40 and the front output shaft 43. The first intermediate shaft 41 is provided with a first intermediate shaft gear Gm1, a first clutch C1 and a forward travelling higher speed clutch FH. The first intermediate shaft gear Gm1 is fixed to the first intermediate shaft 41 while being non-rotatable relatively thereto. The input side of the first clutch C1 and that of the forward travelling higher speed clutch FH commonly have a first clutch pack 51. The first clutch pack 51 is fixed to the first intermediate shaft 41 while being non-rotatable relatively thereto. A first pack gear Gp1 is disposed on the outer periphery of the first clutch pack 51. The first pack gear Gp1 is meshed with the forward travelling lower speed clutch gear Gcfl. A first clutch gear Gc1 is disposed on the output side of the first clutch C1, while a forward travelling higher speed clutch gear Gcfh is disposed on the output side of the forward travelling higher speed clutch FH. The forward travelling higher speed clutch gear Gcfh is meshed with the input shaft gear Gi. The first clutch gear Gc1 and the forward travelling higher speed clutch gear Gcfh are both supported by the first intermediate shaft 41 while being rotatable relatively thereto.

Second Intermediate Shaft 42

The second intermediate shaft 42 is disposed between the input shaft 40 and the front output shaft 43. The second intermediate shaft 42 is provided with a second intermediate shaft gear Gm2, a second clutch C2 and a third clutch C3. The second intermediate shaft gear Gm2 is fixed to the second intermediate shaft 42 while being non-rotatable relatively thereto. The second intermediate gear Gm2 is meshed with the forward travelling higher speed clutch gear Gcfh. The input side of the second clutch C2 and that of the third clutch C3 commonly have a second clutch pack 52. The second clutch pack 52 is fixed to the second intermediate shaft 42 while being non-rotatable relatively thereto. A second pack gear Gp2 is disposed on the outer periphery of the second clutch pack 52. The second pack gear Gp2 is meshed with the first clutch gear Gc1. A second clutch gear Gc2 is disposed on the output side of the second clutch C2 while a third clutch gear Gc3 is disposed on the output side of the third clutch C3. The third clutch gear Gc3 is meshed with the first pack gear Gp1. The second clutch gear Gc2 and the third clutch gear Gc3 are both supported by the second intermediate shaft 42 while being rotatable relatively thereto.

Front Output Shaft 43

The front output shaft 43 is disposed in the lowest position among the shafts 40 to 45. Further, the front output shaft 43 is allowed to be coupled to the front wheels 12. The front output shaft 43 is provided with a driving method switching clutch CS. The driving method switching clutch CS is configured to transmit power of the second intermediate shaft 42 to the front output shaft 43 when set to be in a power transmitted state (=clutch-on), whereas being configured to block transmission of power between the second intermediate shaft 42 and the front output shaft 43 when set to be in a power blocked state (=clutch-off). In other words, the driving method switching clutch CS is a clutch for switching between two-wheel driving and four-wheel driving. A clutch pack 53 of the driving method switching clutch CS is fixed to the front output shaft 43 while being non-rotatable relatively thereto. Further, a first front output shaft gear Gf1 and a second front output shaft gear Gf2 are disposed on the input side of the clutch CS. These front output shaft gears Gf1 and Gf2 are both rotatably supported by the front output shaft 43. Further, the both gears Gf1 and Gf2 are fixed while being non-rotatable relatively to each other. It should be noted that the both gears Gf1 and Gf2 may be formed by a single member.

Rear Output Shaft 44

The rear output shaft 44 is disposed in a position higher than that of the front output shaft 43. Further, unlike conventional transmissions, the rear output shaft 44 is formed by a shaft different from the second intermediate shaft 42 and the both shafts are separated away from each other. The rear output shaft 44 is allowed to be coupled to the rear wheels 13. The rear output shaft 44 is provided with a rear output shaft gear Gr and a parking brake PB. The rear output shaft gear Gr is fixed to the rear output shaft 44 while being non-rotatable relatively thereto. The rear output shaft gear Gr is meshed with the second front output shaft gear Gf2.

Reverse Shaft 45

The reverse shaft 45 is provided with a rearward travelling first gear Gb1 and a rearward travelling second gear Gb2 that are non-rotatable relatively thereto. The rearward travelling first gear Gb1 is meshed with the rearward travelling clutch gear Gcr. The rearward travelling second gear Gb2 is meshed with the first pack gear Gp1.

Power Transmission Mechanism

As described above, the plural gears and clutches form a first power transmission mechanism for transmitting power from the input shaft 40 to the first intermediate shaft 41 and the second intermediate shaft 42. Further, the second intermediate shaft gear Gm2, the first and second front output shaft gears Gf1 and Gf2 and the driving method switching clutch CS form a second power transmission mechanism for transmitting power from the second intermediate shaft 42 to the front output shaft 43 and for transmitting power from the front output shaft 43 to the rear output shaft 44.

It should be noted that each of the parking brake PB and the aforementioned respective clutches is formed by a hydraulic clutch (brake) that includes a plurality of friction plates and is provided with a piston to be actuated by means of hydraulic pressure.

Control Block

Figures 3, 4:
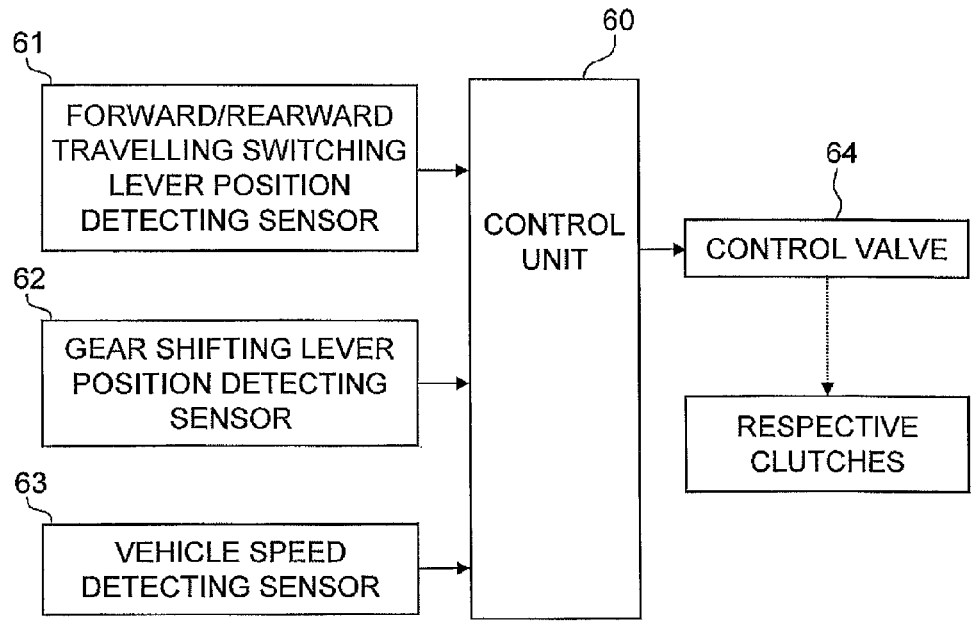
FIG. 3 is a control block diagram of the backhoe loader.
FIG. 4 is a table representing on and off states of respective clutches at respective speed stages in the transmission represented in FIG. 2.

FIG. 3 represents a control block regarding gear shifting control. The backhoe loader 1 includes a control unit 60. A sensor 61 for detecting the position of the forward/rearward travelling switching lever, a sensor 62 for detecting the position of the gear shifting lever and a sensor 63 for detecting the vehicle speed are connected to the control unit 60. Further, control valves 64 for controlling clutches are connected to the control unit 60. It should be noted that FIG. 3 represents the single control valve 64 but each clutch is provided with a control valve. In other words, a plurality of control valves are connected to the control unit 60. Further, the control unit 60 receives signals from the respective sensors 61, 62 and 63; outputs control signals to the respective control valves 64; and controls turning on and off of a plurality of hydraulic clutches mounted on the respective shafts of the transmission 6.

Specifically, as represented in FIGS. 4 to 6, the control unit 60 controls turning on and off of the respective clutches in response to operations of the forward/rearward travelling switching lever and the gear shifting lever. FIG. 4 represents clutches to be turned on and clutches to be turned off at respective speed stages in forward and rearward travelling. FIG. 4 represents a clutch-on state with "○". Further, FIG. 5 represents pre-gear shifting speed stages and post-gear shifting speed stages where the forward/rearward travelling switching lever is operated from a rearward travelling position to a forward travelling position, whereas FIG. 6 represents a case opposite to FIG. 5. In FIGS. 5 and 6, clutches to be turned on at each speed stage is represented within "( )" in a cell of the speed stage. For example, FIG. 5 represents that the rearward travelling clutch R and the first clutch C1 are turned on at a rearward travelling first speed stage (R1).

It should be noted that the position of the gear shifting lever can be selected from four positions, i.e., "1", "2", "3" and "A" as represented in FIGS. 5 and 6. The maximum speed stages are determined by these positions. Specifically, the maximum speed stages are set to be: a forward travelling first speed stage (F1) and a rearward travelling first speed stage (R1) where the position of the gear shifting lever is "1"; forward travelling first and second speed stages (F1, F2) and rearward travelling first and second speed stages (R1, R2) where the position of the gear shifting lever is "2"; forward travelling first to third speed stages (F1 to F3) and rearward travelling first to third speed stages (R1 to R3) where the position of the gear shifting lever is "3"; and forward travelling first to fifth speed stages (F1 to F5) and rearward travelling first to third speed stages (R1 to R3) where the position of the gear shifting lever is "A".

Power Transmission Paths at Respective Gear Stages

Next, power transmission paths at the respective gear stages will be explained. It should be herein noted that a case to be explained relates to four-wheel driving that power is transmitted from the engine to the front wheels 12 and the rear wheels 13 while the driving method switching clutch CS is being constantly turned on.

Forward Travelling First Speed Stage

In the case of the forward travelling first speed stage (F1), the forward travelling lower speed clutch FL and the first clutch C1 are turned on while the other clutches are turned off.

Figure 7:
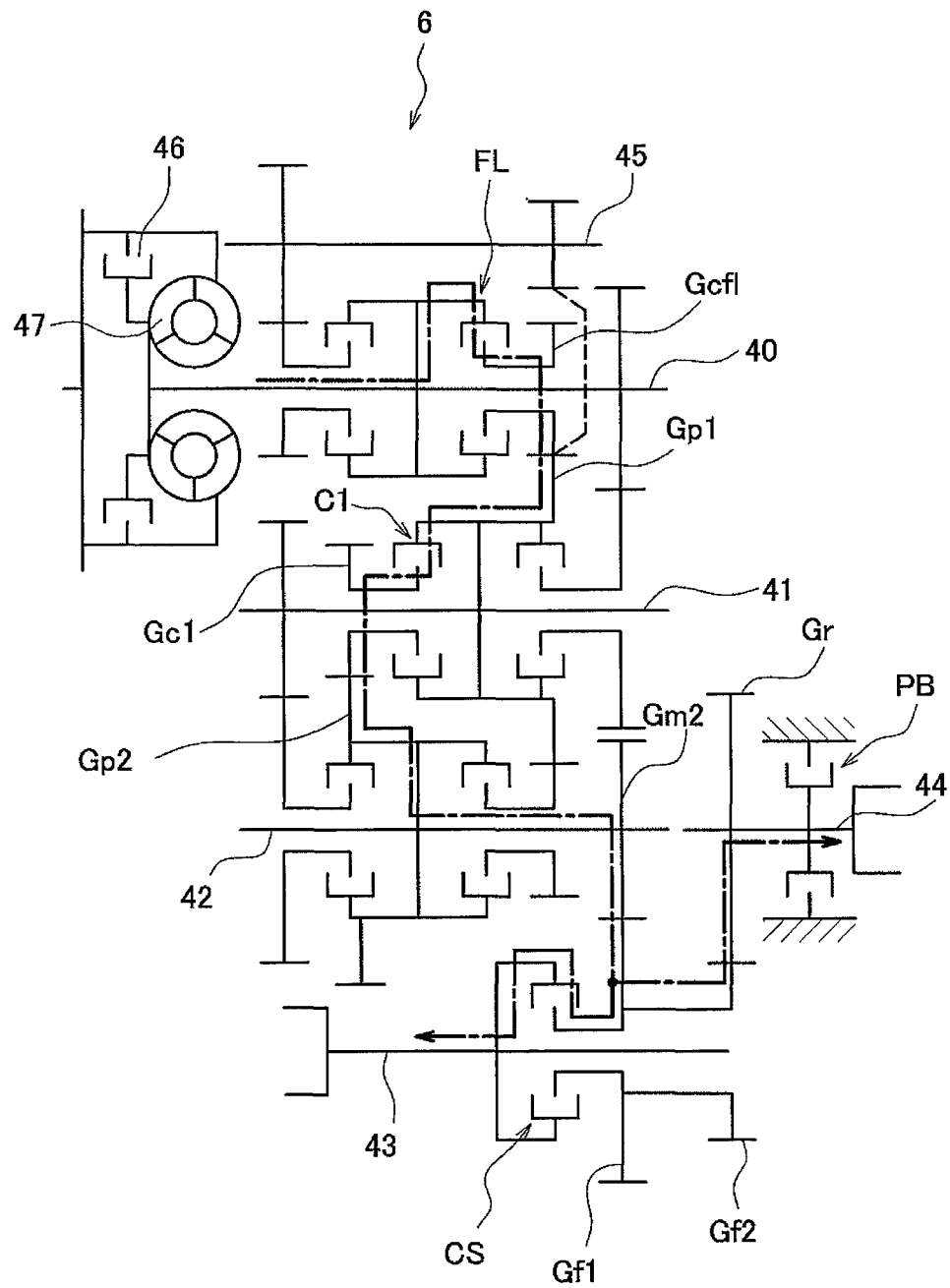
FIG. 7 is a diagram representing a power transmission path at a forward travelling first speed stage.

In this case, as depicted with an arrow of a dashed dotted line in FIG. 7, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→First clutch C1→First clutch gear Gc→Second pack gear Gp2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43

Rear wheel side: →Second front output shaft gear Gf2→Rear output shaft gear Gr→Rear output shaft 44

Forward Travelling Second Speed Stage

In the case of the forward travelling second speed stage (F2), the forward travelling lower speed clutch FL and the second clutch C2 are turned on while the other clutches are turned off.

Figure 8:
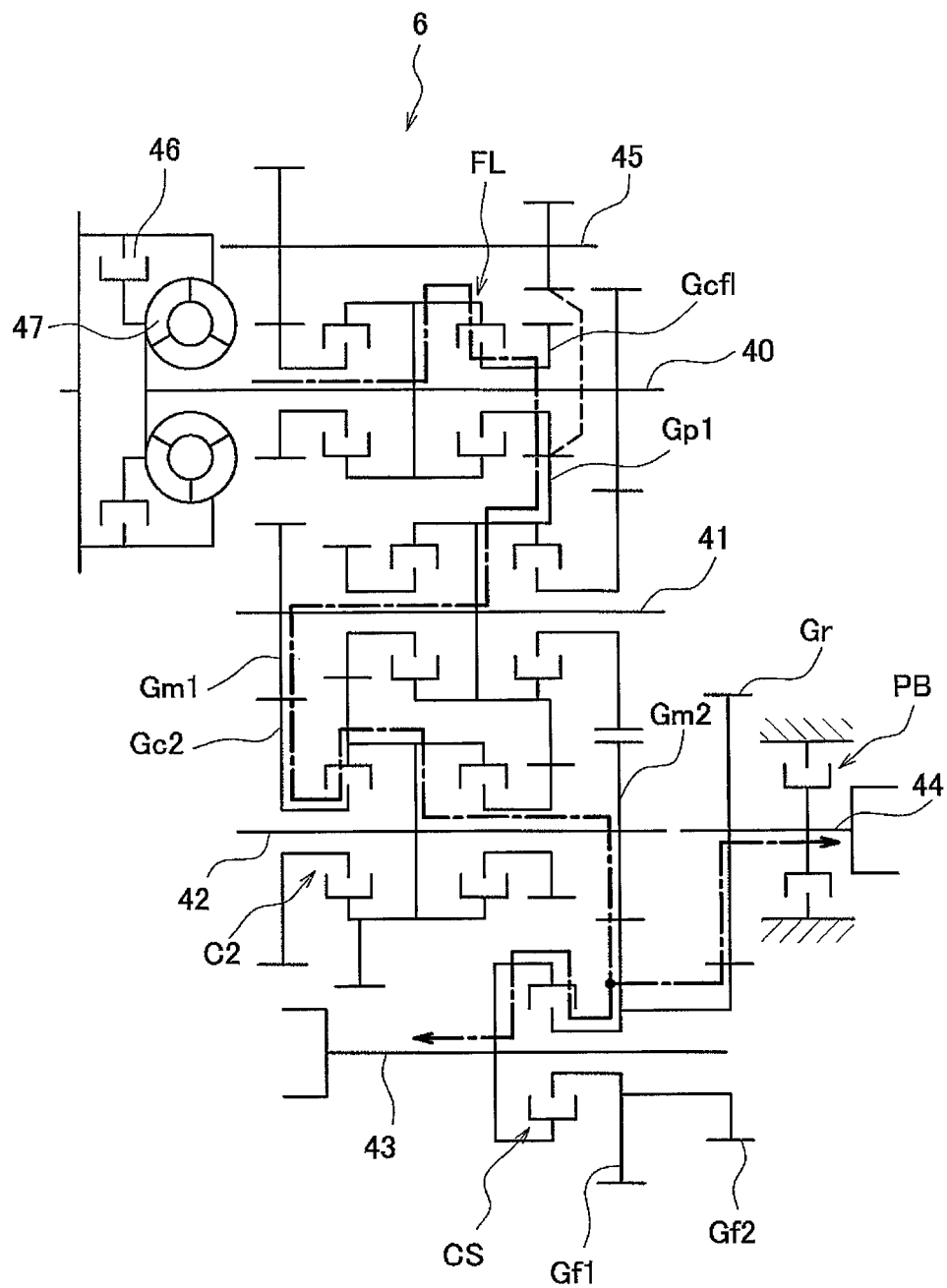
FIG. 8 is a diagram representing a power transmission path at a forward travelling second speed stage.

In this case, as depicted with an arrow of a dashed dotted line in FIG. 8, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→First intermediate shaft 41→First intermediate shaft gear Gm1→Second clutch gear Gc2→Second clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43

Rear wheel side: →Second front output shaft gear Gf2→Rear output shaft gear Gr→Rear output shaft 44

Forward Travelling Third Speed Stage

In the case of the forward travelling third speed stage (F3), the forward travelling higher speed clutch FH and the second clutch C2 are turned on while the other clutches are turned off.

Figure 9:
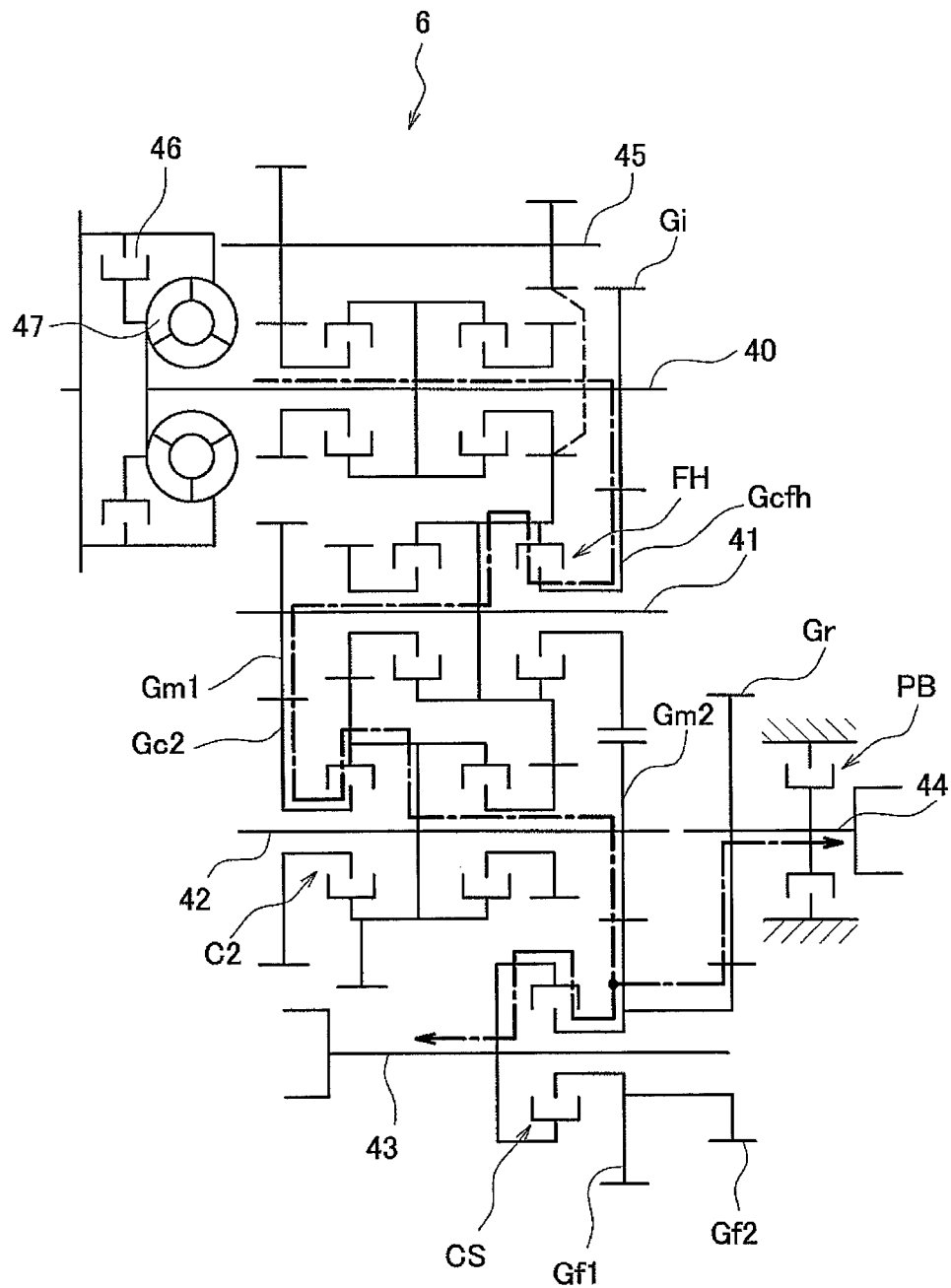
FIG. 9 is a diagram representing a power transmission path at a forward travelling third speed stage.

In this case, as depicted with an arrow of a dashed dotted line in FIG. 9, power inputted into the input shaft 40 is transmitted to the front output shaft 43 and the rear output shaft 44 through the following path.

Input shaft 40→Input shaft gear Gi→Forward travelling higher speed clutch gear Gcfh→Forward travelling higher speed clutch FH→First intermediate shaft 41→First intermediate shaft gear Gm1→Second clutch gear Gc2→Second clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43

Rear wheel side: →Second front output shaft gear Gf2→Rear output shaft gear Gr→Rear output shaft 44

Forward Travelling Fourth Speed Stage

In the case of the forward travelling fourth speed stage (F4), the forward travelling lower speed clutch FL and the third clutch C3 are turned on while the other clutches are turned off.

Figure 10:
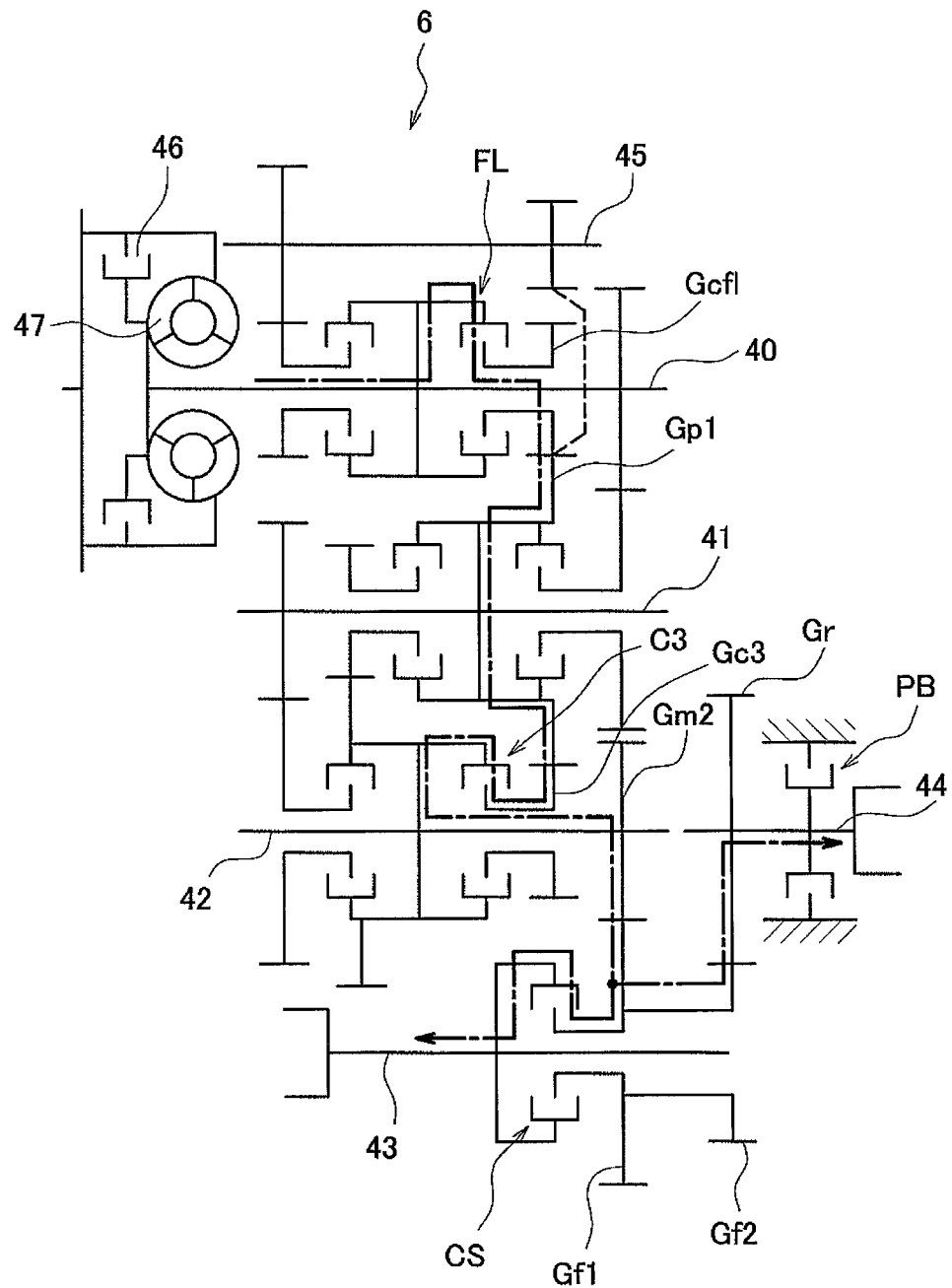
FIG. 10 is a diagram representing a power transmission path at a forward travelling fourth speed stage.

In this case, as depicted with an arrow of a dashed dotted line in FIG. 10, power inputted into the input shaft 40 is transmitted to the front output shaft 43 and the rear output shaft 44 through the following path.

Input shaft 40→Forward travelling lower speed clutch FL→Forward travelling lower speed clutch gear Gcfl→First pack gear Gp1→Third clutch gear Gc3→Third clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43

Rear wheel side: →Second front output shaft gear Gf2→Rear output shaft gear Gr→Rear output shaft 44

Forward Travelling Fifth Speed Stage

In the case of the forward travelling fifth speed stage (F5), the forward travelling higher speed clutch FH and the third clutch C3 are turned on while the other clutches are turned off.

Figure 11:
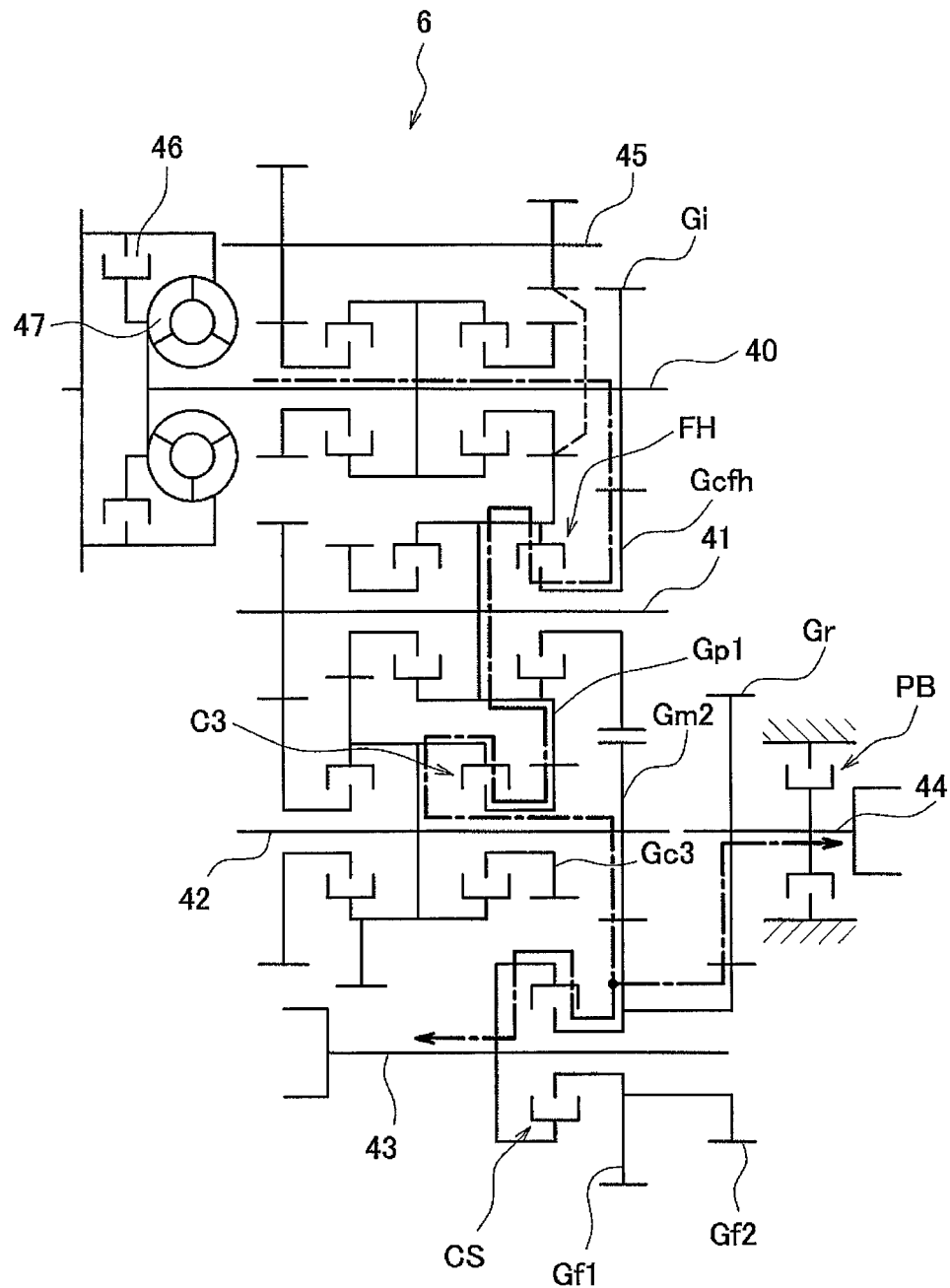
FIG. 11 is a diagram representing a power transmission path at a forward travelling fifth speed stage.

In this case, as depicted with an arrow of a dashed dotted line in FIG. 11, power inputted into the input shaft 40 is transmitted to the front output shaft 43 and the rear output shaft 44 through the following path.

Input shaft 40→Input shaft gear Gi→Forward travelling higher speed clutch gear Gcfh→Forward travelling higher speed clutch FH→First intermediate shaft 41→First pack gear Gp1→Third clutch gear Gc3→Third clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Rearward Travelling First Speed Stage

In the case of the rearward travelling first speed stage (R1), the rearward travelling clutch R and the first clutch C1 are turned on while the other clutches are turned off.

Figure 12:
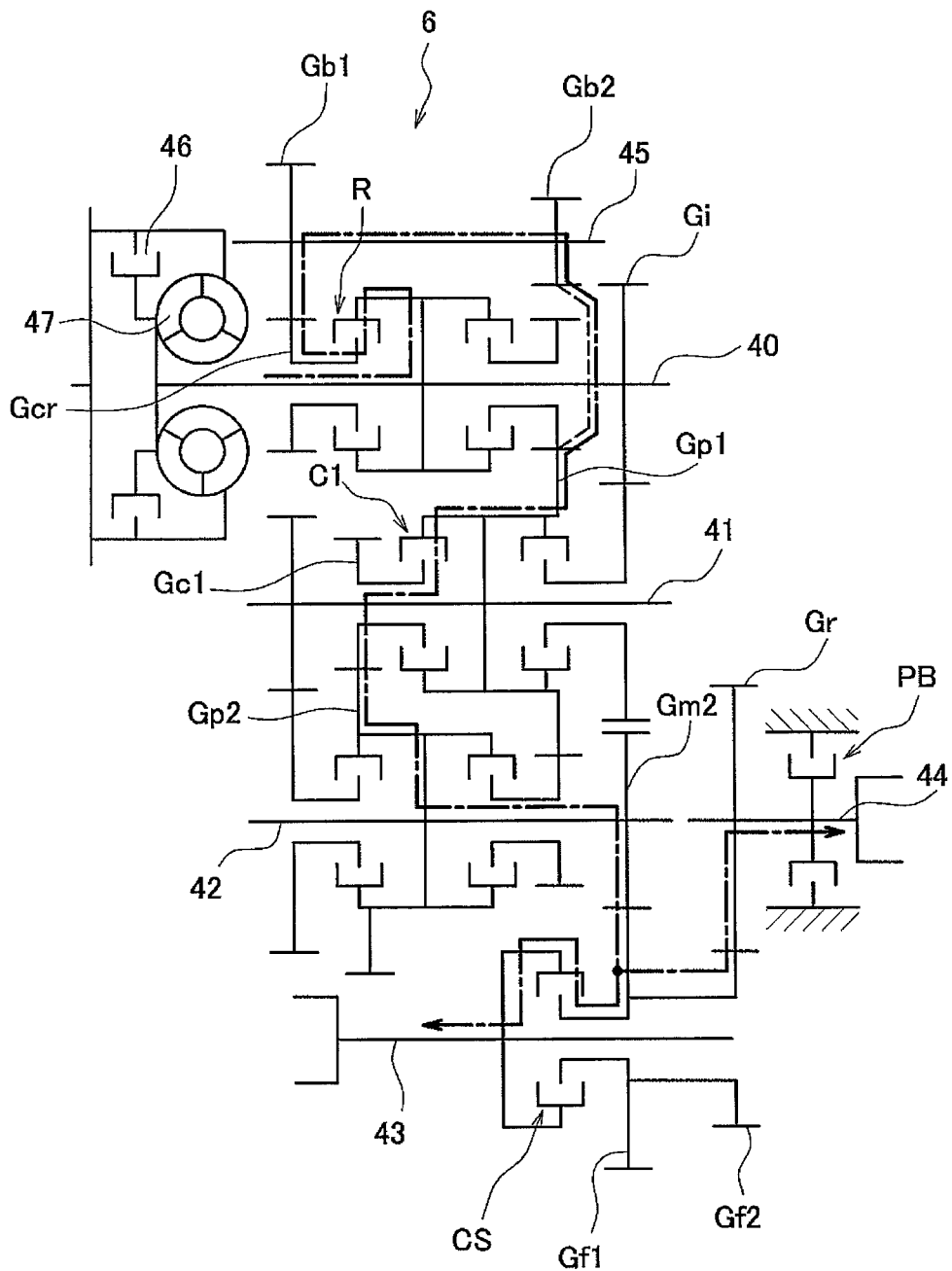
FIG. 12 is a diagram representing a power transmission path at a rearward travelling first speed stage.

In this case, as depicted with an arrow of a dashed dotted line in FIG. 12, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→First clutch C1→First clutch gear Gc1→Second pack gear Gp2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf1→Rear output shaft gear Gr→Rear output shaft 44

Rearward Travelling Second Speed Stage

In the case of the rearward travelling second speed stage (R2), the rearward travelling clutch R and the second clutch C2 are turned on (transmission of power) while the other clutches are turned off (blockage of power).

Figure 13:
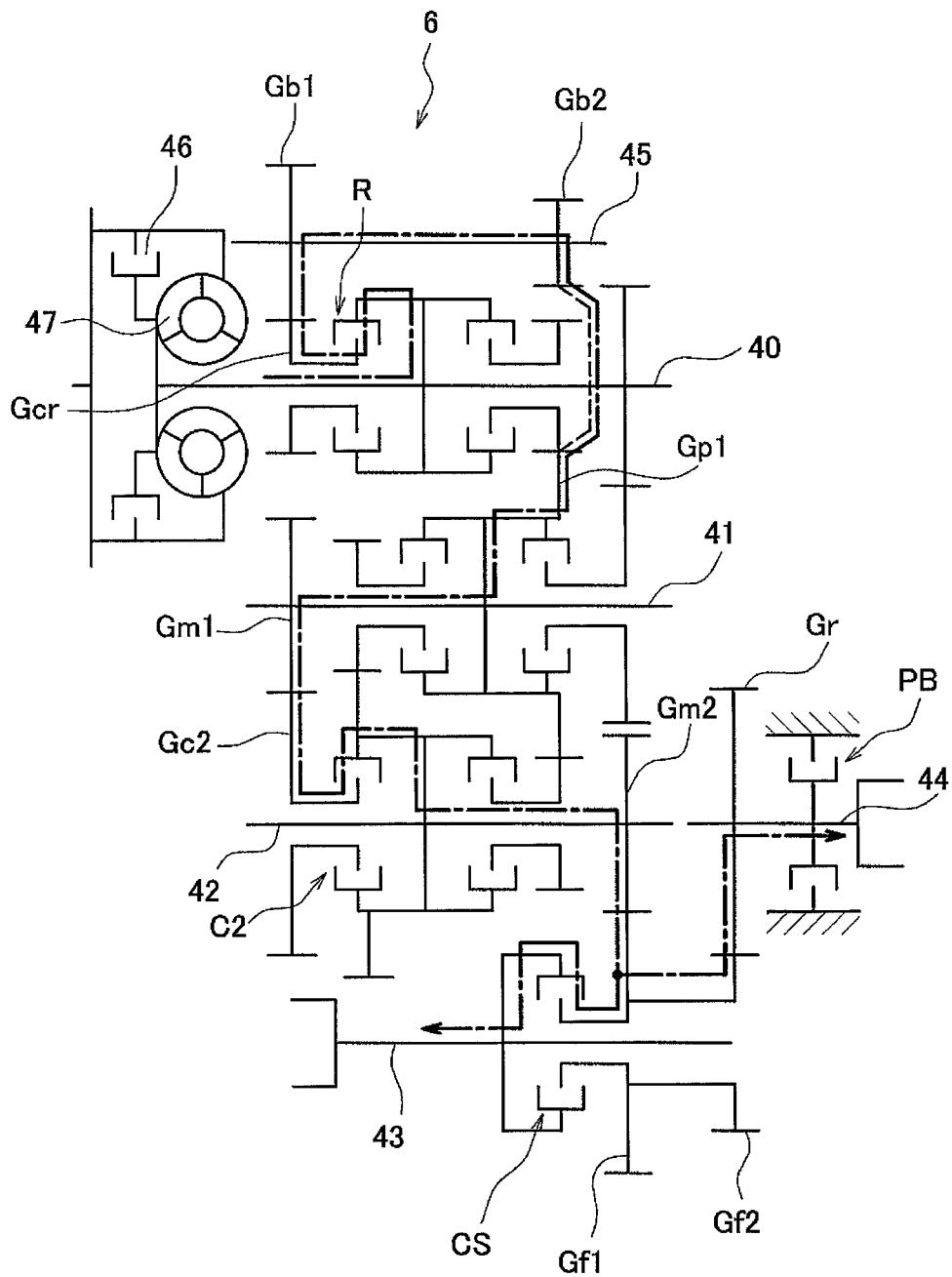
FIG. 13 is a diagram representing a power transmission path at a rearward travelling second speed stage.

In this case, as depicted with an arrow of a dashed dotted line in FIG. 13, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→First intermediate shaft 41→First intermediate shaft gear Gm1→Second clutch gear Gc2→Second clutch C2→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Rearward Travelling Third Speed Stage

In the case of the rearward travelling third speed stage (R3), the rearward travelling clutch R and the third clutch C3 are turned on while the other clutches are turned off.

Figure 14:
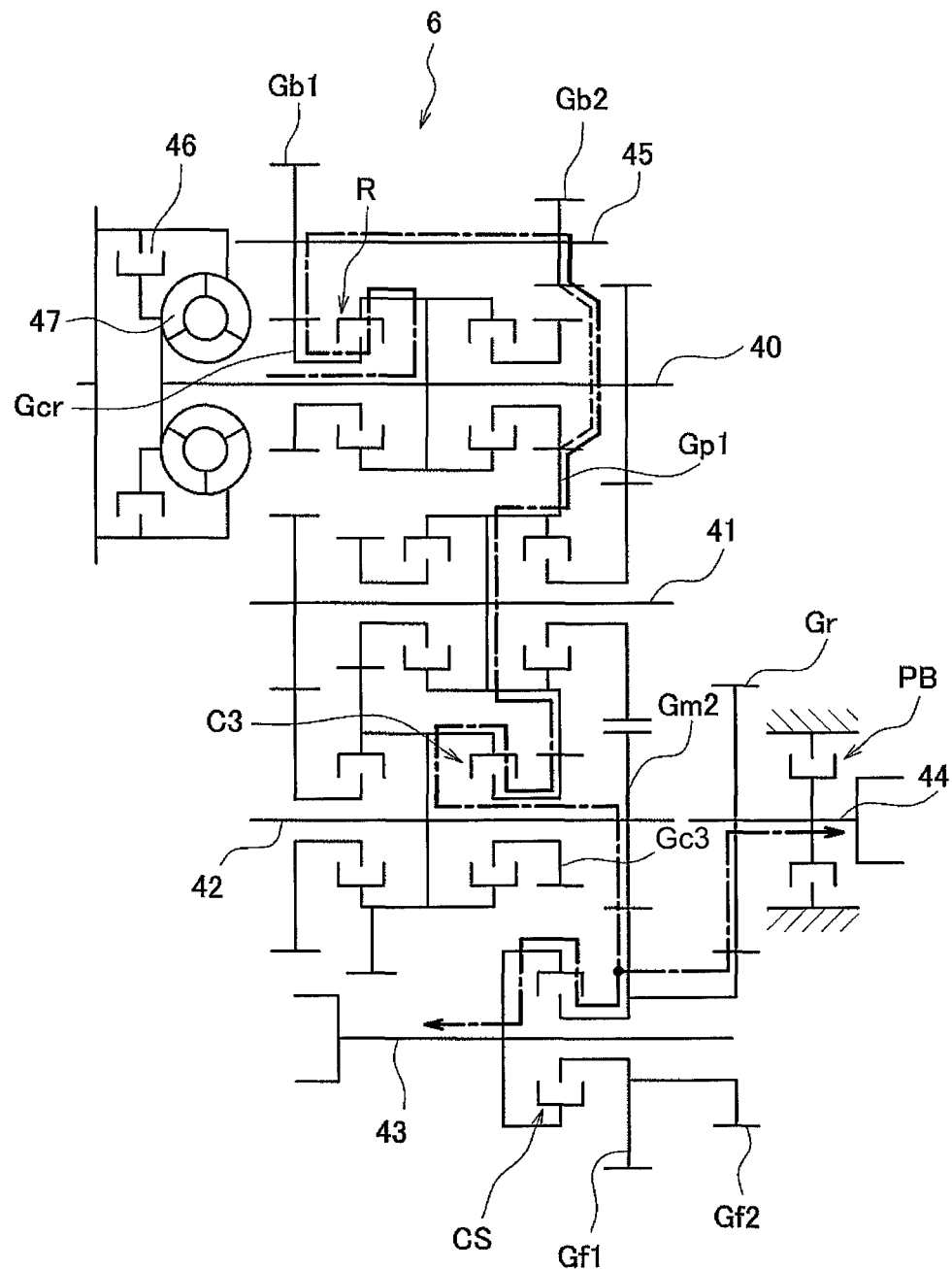
FIG. 14 is a diagram representing a power transmission path at a rearward travelling third speed stage.

In this case, as depicted with an arrow of a dashed dotted line in FIG. 14, power inputted into the input shaft 40 is transmitted to the front output shaft 43 and the rear output shaft 44 through the following path.

Input shaft 40→Rearward travelling clutch R→Rearward travelling clutch gear Gcr→Rearward travelling first gear Gb1→Reverse shaft 45→Rearward travelling second gear Gb2→First pack gear Gp1→Third clutch gear Gc3→Third clutch C3→Second intermediate shaft 42→Second intermediate shaft gear Gm2→First front output shaft gear Gf1

As described below, power is transmitted while being divided at the first front output shaft gear Gf1 into the front wheel side and the rear wheel side.

Front wheel side: →Driving method switching clutch CS→Front output shaft 43
Rear wheel side: →Second front output shaft gear Gf2→Rear output shaft gear Gr→Rear output shaft 44

Operation of Switching between Forward Travelling and Rearward Travelling

When either an operation of switching from forward travelling to rearward travelling or an operation of switching from rearward travelling to forward travelling is executed in a V-shape work, a post-gear shifting speed stage is selected based on tables in FIGS. 5 and 6. It should be noted that in FIGS. 5 and 6, "clutch switching number" refers to the number of clutches that require switching of turning on and off in gear shifting. A control of switching between forward travelling and rearward travelling will be hereinafter explained in detail.

I. Rearward Travelling→Forward Travelling

Rearward Travelling First Speed Stage (R1)→Forward Travelling Stage

When the forward/rearward travelling switching lever is switched into a forward travelling position during execution of a work at the rearward travelling first speed stage, a post-gear shifting speed stage is selected as follows.

(i) Where the position of the gear shifting lever is "1", the forward travelling first speed stage (F1) is selected regardless of the vehicle speed.

It is a normal gear shifting operation that the rearward travelling first speed stage is switched into a forward travelling stage when the position of the gear shifting lever is "1". Therefore, the forward travelling first speed stage is selected with an emphasis on gear shifting performance. Further, when the position of the gear shifting lever is "1", an operator definitely intends to execute a work at a remarkably low speed. Therefore, the forward travelling first speed stage is selected regardless of the vehicle speed with a respect for the operator's intension.

In this case, gear shifting is executed only by switching a single clutch. Therefore, time required for gear shifting is reduced.

(ii) Where the position of the gear shifting lever is other than "1", the forward travelling second speed stage (F2) is selected when the vehicle speed is low in a range of 0 to VR12, whereas the forward travelling fourth speed stage (F4) is selected when the vehicle speed is greater than or equal to VR12.

When the forward travelling second speed stage is selected, switching of two clutches is required in gear shifting and a relatively long time is required for gear shifting. However, when the rearward travelling first speed stage is switched into the forward travelling first speed stage, a load torque is large in switching, and therefore, a speed-up side gear shift point, which is set in automatic gear shifting control, is quickly reached. Accordingly, the forward travelling first speed stage is automatically switched into the forward travelling second speed stage. The forward travelling second speed stage is herein configured to be selected from the beginning for avoiding a time lag to be produced in gear shifting from the forward travelling first speed stage to the forward travelling second speed stage. With the configuration, gear shifting time can be reduced by selecting the forward travelling second speed from the beginning than by selecting the forward travelling first speed stage and then automatically shifting the forward travelling first speed stage to the forward travelling second speed stage.

When the vehicle speed is greater than or equal to VR12, the gear shifting operation is determined to be an abnormal operation and a high gear stage (the forward travelling fourth speed stage) is selected. Accordingly, over rotation of the respective elements in the transmission can be inhibited, damage of a bearing and a seal member can be avoided.

Rearward Travelling Second Speed Stage
(R2)→Forward Travelling Stage

Where the forward/rearward travelling switching lever is switched into a forward travelling position during execution of a work at the rearward travelling second speed stage, a post-gear shifting speed stage is selected as follows regardless of the position of the gear shifting lever.

When the vehicle speed is low in a range of 0 to VR22, the gear shifting operation is a normal operation, and therefore, the forward travelling second speed stage (F2) is selected. In this case, gear shifting is executed only by switching a single clutch. Therefore, time required for gear shifting is reduced.

When the vehicle speed is greater than or equal to VR22, the gear shifting operation is determined to be an abnormal operation, and the forward travelling fourth speed stage (F4) is selected. In this case, switching of two clutches is required in gear shifting and a relatively long time is required for gear shifting. However, with the selection of the forward travelling fourth speed stage, over rotation of the respective elements in the transmission can be inhibited and damage of the bearing and the seal member can be avoided.

Rearward Travelling Third Speed Stage
(R3)→Forward Travelling Stage

Where the forward/rearward travelling switching lever is switched into a forward travelling position during execution of a work at the rearward travelling third speed stage, a post-gear shifting speed stage is selected as follows regardless of the position of the gear shifting lever.

When the vehicle speed is low in a range of 0 to VR32, the forward travelling second speed stage (F2) is selected. It is not a normal operation that the forward/rearward travelling switching lever is switched into a forward travelling position during execution of a work at the rearward travelling third speed stage. However, it is not required to consider protection against over rotation as described above in switching from the rearward travelling third speed stage to a forward travelling stage. Therefore, similarly to the case of normal gear shifting, the forward travelling second speed stage is selected with an emphasis on post-gear shifting acceleration performance. It should be noted that switching of two clutches is herein required in gear shifting and a relatively long time is required for gear shifting.

When the vehicle speed is greater than or equal to VR32, the gear shifting operation is determined to be an abnormal operation and the forward travelling fourth speed stage (F4) is selected. In this case, gear shifting is executed only by switching a single clutch. Therefore, time required for gear shifting is reduced. In addition, with the selection of the forward travelling fourth speed stage, over rotation of the respective elements in the transmission can be inhibited and damage of the bearing and the seal member can be avoided.

II. Forward Travelling→Rearward Travelling

Forward Travelling First Speed Stage
(F1)→Rearward Travelling Stage

Where the forward/rearward travelling switching lever is switched into a rearward travelling position during execution of a work at the forward travelling first speed stage, a post-gear shifting speed stage is selected as follows.

(i) Where the position of the gear shifting lever is "1", the rearward travelling first speed stage (R1) is selected regardless of the vehicle speed.

It is a normal gear shifting operation that the forward travelling first speed stage is switched into a rearward travelling stage where the position of the gear shifting lever is "1". Further, where the position of the gear shifting lever is "1", an operator definitely intends to execute a work at a remarkably low speed. Therefore, the rearward travelling first speed stage is selected regardless of the vehicle speed with a respect for the operator's intension.

In this case, gear shifting is executed only by switching a single clutch. Therefore, time required for gear shifting is reduced.

(ii) Where the position of the gear shifting lever is other than "1", the rearward travelling second speed stage (R2) is selected when the vehicle speed is low in a range of 0 to VR12, whereas the rearward travelling third speed stage (R3) is selected when the vehicle speed is greater than or equal to VF12.

When the rearward travelling second speed stage is selected, switching of two clutches is required in gear shifting and a relatively long time is required for gear shifting. However, the rearward travelling second speed stage is selected from the beginning after gear shifting because of completely the same reason as the case of gear shifting from the rearward travelling first speed stage to the forward travelling first speed stage, in other words, for avoiding a time lag to be produced in automatically shifting the rearward travelling first speed stage to the rearward travelling second speed stage. Accordingly, gear shifting time can be consequently reduced.

When the vehicle speed is greater than or equal to VF12, the gear shifting operation is determined to be an abnormal operation. Accordingly, a high gear stage (the rearward travelling third speed stage) is selected for inhibiting over rotation of the respective elements in the transmission and for avoiding damage of the bearing and the seal member.

Forward Travelling Second Speed Stage
(F2)→Rearward Travelling Stage

Where the forward/rearward travelling switching lever is switched into a rearward travelling position during execution of a work at the forward travelling second speed stage, a post-gear shifting speed stage is selected as follows regardless of the position of the gear shifting lever.

When the vehicle speed is low in a range of 0 to VF22, the gear shifting operation is a normal operation, and therefore, the rearward travelling second speed stage (R2) is selected. In this case, gear shifting is executed only by switching a single clutch. Therefore, time required for gear shifting is reduced.

When the vehicle speed is greater than or equal to VF22, the gear shifting operation is determined to be an abnormal operation, and the rearward travelling third speed stage (R3) is selected. In this case, switching of two clutches is required in gear shifting, and a relatively long time is required for gear shifting. However, with the selection of the rearward travelling third speed stage, over rotation of the respective elements in the transmission can be inhibited and damage of the bearing and the seal member can be avoided.

Forward Travelling Third Speed Stage
(F3)→Rearward Travelling Stage

Where the forward/rearward travelling switching lever is switched into a rearward travelling position during execution of a work at the forward travelling third speed stage, a post-gear shifting speed stage is selected as follows regardless of the position of the gear shifting lever.

When the vehicle speed is low in a range of 0 to VF32, the rearward travelling second speed stage (R2) is selected. It is not a normal operation that the forward/rearward travelling switching lever is switched into a rearward travelling position during execution of a work at the forward travelling third speed stage. However, it is not required to consider protection against over rotation within the transmission in switching from the forward travelling third speed stage to a rearward travelling stage. Therefore, similarly to the case of normal gear shifting, the rearward travelling second speed stage is selected with an emphasis on post-gear shifting acceleration performance. It should be noted that gear shifting is herein executed only by switching a single clutch, and therefore, time required for gear shifting is reduced.

When the vehicle speed is greater than or equal to VF32, the gear shifting operation is determined to be an abnormal operation, and the rearward travelling third speed stage (R3) is selected. In this case, switching of two clutches is required in gear shifting and a relatively long time is required for gear shifting. However, with the selection of the rearward travelling third speed stage, over rotation of the respective elements in the transmission can be inhibited and damage of the bearing and the seal member can be avoided.

Forward Travelling Fourth Speed Stage
(F4)→Rearward Travelling Stage

Where the forward/rearward travelling switching lever is switched into a rearward travelling position during execution of a work at the forward travelling fourth speed stage, a post-gear shifting speed stage is selected as follows regardless of the position of the gear shifting lever.

When the vehicle speed is low in a range of 0 to VF42, the rearward travelling second speed stage (R2) is selected. It is not a normal operation that the forward/rearward travelling switching lever is switched into a rearward travelling position during execution of a work at the forward travelling fourth speed stage. However, the rearward travelling second speed stage is selected because of the same reason as the case of switching from the forward travelling third speed stage into a rearward travelling stage. In this case, switching of two clutches is required in gear shifting and a relatively long time is required for gear shifting.

When the vehicle speed is greater than or equal to VF42, the gear shifting operation is determined to be an abnormal operation and the rearward travelling third speed stage (R3) is selected. In this case, gear shifting is executed only by switching a single clutch. Therefore, time required for gear shifting is reduced. In addition, with the selection of the rearward travelling third speed stage, over rotation of the respective elements can be inhibited and damage of the bearing and the seal member can be avoided.

Forward Travelling Fifth Speed Stage
(F5)→Rearward Travelling Stage

Where the forward/rearward travelling switching lever is switched into a rearward travelling position during execution of a work at the forward travelling fifth speed stage, a post-gear shifting speed stage is selected completely the same as the case of switching from the forward travelling third speed stage to a rearward travelling stage and the case of switching from the forward travelling fourth speed stage to a rearward travelling stage. It should be noted that a threshold of the vehicle speed is herein VF52.

Features (1) In a forward/rearward travelling switching operation during execution of a V-shape work, gear shifting is enabled by switching only the forward travelling lower speed clutch and the rearward travelling clutch amongst the forward/rearward travelling switching clutches, i.e., the forward travelling lower speed clutch, the forward travelling higher speed clutch and the rearward clutch. Therefore, a load torque of the forward travelling higher speed clutch is small and the forward travelling higher speed clutch can be reduced in its size.

(2) Where the forward/rearward travelling switching lever is switched from the rearward travelling position to the forward travelling position or from the forward travelling position to the rearward travelling position during execution of a V-shape work at a low vehicle speed, gear shifting is executed while turning on and off of the speed stage switching clutches are maintained and only one of the forward/rearward travelling switching clutches is turned on. Therefore, gear shifting time can be reduced.

(3) Where the forward/rearward travelling switching lever is operated at a high vehicle speed, the gear shifting operation is determined to be an abnormal operation and a high speed stage is selected as a post-gear shifting speed stage. Therefore, over rotation of the respective elements in the transmission can be inhibited and damage of the bearing and the seal member can be avoided.

(4) Where the position of the gear shifting lever is set to be in "1", either the forward travelling first speed stage or the rearward travelling first speed stage is selected as a post-gear shifting speed stage regardless of the vehicle speed with a respect for operator's intension. Therefore, a work can be executed at a speed in accordance with the operator's intension.

(5) The rearward travelling clutch and the forward travelling lower speed clutch, frequently used in the backhoe loader, are mounted on the input shat that a load torque acting thereon is the smallest. Therefore, the capacities of these clutches can be reduced. Further, abrasion of these clutches can be inhibited.

OTHER EXEMPLARY EMBODIMENTS

The present invention is not limited to the exemplary embodiment as described above and a variety of changes or modifications can be herein made without departing from the scope of the present invention.

(1) In the aforementioned exemplary embodiment, the present invention is applied to the backhoe loader. However, the present invention can be similarly applied to other work vehicles such as a wheel loader.

(2) The aforementioned exemplary embodiment has been explained by exemplifying the transmission that includes two intermediate shafts. However, the number of intermediate shafts is not limited. The present invention can be similarly applied to either a transmission including a single intermediate shaft or that including three or more intermediate shafts.

(3) The number of gear stages in the aforementioned exemplary embodiment is exemplary only, and the present invention is not limited to the number of gear stages. Further, the arrangements of the respective clutches are similarly not limited to those in the aforementioned exemplary embodiment.

According to the illustrated embodiments, especially in a work vehicle for executing a V-shape work, enhancement of a clutch for switching between forward travelling and rearward travelling can be minimized and increase in size of a transmission can be inhibited.

The invention claimed is:

1. A transmission for a work vehicle having a forward/reverse switching lever and a gear shifting lever, the transmission being of a multi-axis type to be installed in the work vehicle for executing a loader work, the transmission comprising:
    an input shaft to which power is inputted;
    an output shaft coupled to a wheel of the work vehicle;
    at least one intermediate shaft disposed between the input shaft and the output shaft;
    a power transmission mechanism configured to transmit power from the input shaft to the output shaft through the at least one intermediate shaft; and
    a switching unit that is operatively coupled to the forward/rearward switching lever and the gear shifting lever, the switching unit being configured to switch a power transmission path from the input shaft to the output shaft in response to operation of the forward/rearward switching lever and the gear shifting lever;
    wherein the power transmission mechanism includes
        a forward travelling lower speed clutch configured to be set in a power transmitted state in a forward travelling lower speed range,
        a forward travelling higher speed clutch configured to be set in the power transmitted state in a forward travelling higher speed range,
        a rearward travelling clutch configured to be set in the power transmitted state in rearward travelling, and
        a plurality of speed stage switching clutches configured to switch among a plurality of speed stages, and
    the switching unit is configured to
        switch a gear stage into a shiftable rearward travelling gear stage by setting either the forward travelling lower speed clutch or the forward travelling higher speed clutch in a power blocked state and by setting the rearward travelling clutch in the power transmitted state upon the forward/rearward switching lever being operated to switch into rearward travelling during forward travelling, and
        switch the gear stage into a shiftable forward travelling gear stage by setting the rearward travelling clutch in the power blocked state and by setting the forward travelling lower speed clutch in the power transmitted state upon the forward/rearward switching lever being operated to switch into forward travelling being executed during rearward travelling, the forward travelling higher speed clutch being kept in the power blocked state regardless of a position of the gear shifting lever during the switching into forward travelling.

2. The transmission for a work vehicle recited in claim 1, wherein
    the switching unit is configured to maintain either the power transmitted state or the power blocked state of each of the speed stage switching clutches in executing a forward/rearward travelling switching operation.

3. The transmission for a work vehicle recited in claim 1, further comprising
    a vehicle speed detecting unit configured to detect a vehicle speed,
    wherein the switching unit is configured to control the power transmitted state and the power blocked state of the speed stage switching clutches in accordance with a detection result of the vehicle speed detecting unit in executing the forward/rearward travelling switching operation.

4. The transmission for a work vehicle recited in claim 1, further comprising
    a gear shifting lever position detecting unit configured to detect a position of the gear shifting lever for determining a maximum speed stage,
    wherein the switching unit is configured to control the power transmitted state and the power blocked state of the speed stage switching clutches in accordance with a detection result of the gear shifting lever position detecting unit in executing the forward/rearward travelling switching operation.

5. The transmission for a work vehicle recited in claim 1, wherein
    the speed stage switching clutches include a first clutch, a second clutch and a third clutch, and
    the switching unit is configured to
        switch among five forward travelling speed stages from a forward travelling first speed stage to a forward travelling fifth speed stage and switch among speed stages from a rearward travelling first speed stage to a rearward travelling third speed stage,
        set the forward travelling lower speed clutch and the first clutch in the power transmitted stage and set the other clutches in the power blocked state at the forward travelling first speed stage,
        set the forward travelling lower speed clutch and the second clutch in the power transmitted state and set the other clutches in the power blocked state at the forward travelling second speed stage,
        set the forward travelling higher speed clutch and the second clutch in the power transmitted state and set the other clutches in the power blocked state at the forward travelling third speed stage,
        set the forward travelling lower speed clutch and the third clutch in the power transmitted state and set the other clutches in the power blocked state at the forward travelling fourth speed stage,
        set the forward travelling higher speed clutch and the third clutch in the power transmitted state and set the other clutches in the power blocked state at the forward travelling fifth speed stage,
        set the rearward travelling clutch and the first clutch in the power transmitted state and set the other clutches in the power blocked state at the rearward travelling first speed stage,
        set the rearward travelling clutch and the second clutch in the power transmitted state and set the other clutches in the power blocked state at the rearward travelling second speed stage, and set the rearward travelling clutch and the third clutch in the power transmitted state and set the other clutches in the power blocked state at the rearward travelling third speed stage.

6. The transmission for a work vehicle recited in claim 5, wherein
the switching unit is configured to
maintain the power transmitted state of the first clutch while activating/deactivating the power transmitted state of the rearward travelling clutch and deactivating/activating the power transmitted state of the forward travelling lower speed clutch when the forward/rearward travelling switching operation is executed at either the forward travelling first speed stage or the rearward travelling first speed stage,
maintain the power transmitted state of the second clutch while activating/deactivating the power transmitted state of the rearward travelling clutch and deactivating/activating the power transmitted state of the forward travelling lower speed clutch when the forward/rearward travelling switching operation is executed at either the forward travelling second speed stage or the rearward travelling second speed stage,
maintain the power transmitted state of the second clutch while activating the power transmitted state of the rearward travelling clutch and deactivating the power transmitted state of the forward travelling higher speed clutch when the rearward traveling switching operation is executed at the forward travelling third speed stage, maintain the power transmitted state of the third clutch while activating/deactivating the power transmitted state of the rearward travelling clutch and deactivating/activating the power transmitted state of the forward travelling lower speed clutch when the forward/rearward travelling switching operation is executed at either the forward travelling fourth speed stage or the rearward travelling third speed stage, and maintain the power transmitted state of the third clutch while activating the power transmitted state of the rearward travelling clutch and deactivating the power transmitted state of the forward travelling higher speed clutch when the rearward travelling switching operation is executed at the forward travelling fifth speed stage.

7. The transmission for a work vehicle recited in claim 1, wherein
the switching unit includes a control unit and a plurality of control valves, the control valves being connected to the control unit and configured to operate the forward traveling lower speed clutch, the forward traveling higher speed clutch, and the rearward traveling clutch in response to signals from the control unit.

8. The transmission for a work vehicle recited in claim 7, wherein
the forward traveling lower speed clutch and the rearward traveling clutch are provided on the input shaft.

9. The transmission for a work vehicle recited in claim 8, wherein
the forward traveling higher speed clutch and one of the speed stage switching clutches are provided on one of the intermediate shafts.

10. The transmission for a work vehicle recited in claim 7, wherein
the forward traveling higher speed clutch and one of the speed stage switching clutches are provided on one of the intermediate shafts.

11. The transmission for a work vehicle recited in claim 1, wherein
the forward traveling lower speed clutch and the rearward traveling clutch are provided on the input shaft.

12. The transmission for a work vehicle recited in claim 1, wherein
the forward traveling higher speed clutch and one of the speed stage switching clutches are provided on one of the intermediate shafts.

* * * * *